(12) United States Patent
Nam et al.

(10) Patent No.: US 11,594,898 B2
(45) Date of Patent: Feb. 28, 2023

(54) APPARATUS AND METHOD FOR PREVENTING OVERCHARGE OF SECONDARY BATTERY

(71) Applicant: LG CHEM, LTD., Seoul (KR)

(72) Inventors: Jung-Hyun Nam, Daejeon (KR); Jeong-Wook Kim, Daejeon (KR); Wong-Ki Yoon, Daejeon (KR); Suk-Hoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 281 days.

(21) Appl. No.: 16/954,003

(22) PCT Filed: Sep. 27, 2019

(86) PCT No.: PCT/KR2019/012606
§ 371 (c)(1),
(2) Date: Jun. 15, 2020

(87) PCT Pub. No.: WO2020/067777
PCT Pub. Date: Apr. 2, 2020

(65) Prior Publication Data
US 2020/0395779 A1     Dec. 17, 2020

(30) Foreign Application Priority Data

Sep. 27, 2018   (KR) ........................ 10-2018-0114989

(51) Int. Cl.
*H02J 7/00*     (2006.01)
*H01M 10/42*     (2006.01)
*H01M 10/48*     (2006.01)

(52) U.S. Cl.
CPC ....... *H02J 7/00302* (2020.01); *H01M 10/425* (2013.01); *H01M 10/48* (2013.01);
(Continued)

(58) Field of Classification Search
CPC ............ H02J 7/00302; H02J 7/007182; H02J 7/0047; H01M 10/425; H01M 10/48; H01M 2010/4271; H01M 2220/20
(Continued)

(56) References Cited

U.S. PATENT DOCUMENTS 6,124,700 A * 9/2000 Nagai ................. H02J 7/00711
320/132
6,172,482 B1 1/2001 Eguchi
(Continued)

FOREIGN PATENT DOCUMENTS

GB     516 135 A     12/1939
JP     3778872 B2     5/2006
(Continued)

OTHER PUBLICATIONS

International Search Report for PCT/KR2019/012606 dated Jan. 23, 2020.
(Continued)

*Primary Examiner* — Nathaniel R Pelton
(74) *Attorney, Agent, or Firm* — Birch, Stewart, Kolasch & Birch, LLP

(57) ABSTRACT

An apparatus and method for preventing overcharge of a secondary battery that prevents the overcharge of a Starting Lighting Ignition (SLI) battery, which can be applied to both a regulated system with a voltage regulator and an unregulated system without a voltage regulator, by regulating the voltage applied to the cell assembly.

15 Claims, 5 Drawing Sheets

(52) U.S. Cl.
CPC ...... *H02J 7/0047* (2013.01); *H02J 7/007182* (2020.01); *H01M 2010/4271* (2013.01); *H01M 2220/20* (2013.01)

(58) Field of Classification Search
USPC .......................................................... 320/134
See application file for complete search history.

(56) References Cited

U.S. PATENT DOCUMENTS

| | | | |
|---|---|---|---|
| 6,707,273 | B1 | 3/2004 | Gignac |
| 10,661,678 | B2* | 5/2020 | Vidhi ..................... G06Q 20/14 |
| 2010/0253285 | A1* | 10/2010 | Takahashi ........... H02J 7/00038 320/134 |
| 2017/0324266 | A1 | 11/2017 | Park et al. |
| 2018/0062149 | A1 | 3/2018 | Kim |

FOREIGN PATENT DOCUMENTS

| | | |
|---|---|---|
| JP | 2007-325324 A | 12/2007 |
| JP | 2010-246225 A | 10/2010 |
| JP | 2012-55055 A | 3/2012 |
| KR | 10-0739942 B1 | 7/2007 |
| KR | 10-0838718 B1 | 6/2008 |
| KR | 10-0893130 B1 | 4/2009 |
| KR | 10-2014-0020631 A | 2/2014 |
| KR | 10-2017-0124867 A | 11/2017 |
| KR | 10-2018-0025702 A | 3/2018 |

OTHER PUBLICATIONS

Extended European Search Report for EP Patent Application No. 19867822.9 dated Apr. 15, 2021.

* cited by examiner

APPARATUS AND METHOD FOR PREVENTING OVERCHARGE OF SECONDARY BATTERY

TECHNICAL FIELD

The present application claims the benefit of Korean Patent Application No. 10-2018-0114989 filed on Sep. 27, 2018 with the Korean Intellectual Property Office, the disclosure of which is incorporated herein by reference in its entirety.

The present disclosure relates to an apparatus and method for preventing the overcharge of a secondary battery, and more particularly, to an apparatus and method for preventing the overcharge of a secondary battery that prevents the overcharge of a Starting Lighting Ignition (SLI) battery including at least one secondary battery.

BACKGROUND ART

Recently, there is dramatically growing demand for portable electronic products such as laptop computers, video cameras and mobile phones, and with the extensive development of accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

Meanwhile, a Starting Lighting Ignition (SLI) battery that is mounted in an electrically powered device such as a scooter or a tractor have used a lead storage battery due to cost advantages. However, when a lead storage battery is mounted in an electrically powered device with no regulator, the life of the lead storage battery is drastically reduced by overcharge, causing inconvenience caused by the frequent battery replacement.

Accordingly, it is necessary to use an SLI battery that can be applied to both a regulated system and an unregulated system and prevent a life reduction phenomenon caused by overcharge.

DISCLOSURE

Technical Problem

The present disclosure is designed to solve the above-described problem and therefore the present disclosure is directed to providing an improved apparatus and method for preventing overcharge that prevents the overcharge of a Starting Lighting Ignition (SLI) battery including at least one secondary battery.

These and other objects and advantages of the present disclosure will be understood by the following description and will be apparent from the embodiments of the present disclosure. Further, it will be readily understood that the objects and advantages of the present disclosure can be realized by the means set forth in the appended claims and their combination.

Technical Solution

To achieve the above-described object, an apparatus for preventing overcharge according to an embodiment of the present disclosure is an apparatus that prevents the overcharge of a cell assembly provided in a battery pack, the battery pack including at least one secondary battery, the apparatus includes a voltage measuring unit configured to measure a voltage across the cell assembly, a charging FET provided on a charge/discharge line electrically connecting of a negative terminal of the cell assembly and a positive terminal of the cell assembly to one of a negative terminal of the battery pack and a positive terminal of the battery pack, the charging FET being configured to control the conduction of a charge current flowing in the charge/discharge line, a bypass resistor connected in parallel to the charging FET on a bypass line, the bypass line electrically connecting two terminals of the charging FET, and the bypass resistor being configured to cause the charge current to flow according to an opening/closing operation of the charging FET, and a processor configured to receive the voltage across the cell assembly from the voltage measuring unit, and control the opening/closing operation of the charging FET based on the voltage across the cell assembly.

Additionally, the processor may be configured to turn off the charging FET when the charge current charging the cell assembly flows on the charge/discharge line and the voltage across the cell assembly reaches a predetermined upper limit.

Additionally, the processor may be configured to turn on the charging FET when the charge current charging the cell assembly flows on the charge/discharge line and the voltage across the cell assembly reaches a predetermined lower limit.

Additionally, the processor may be configured to repeatedly turn off and on the charging FET when the voltage across the cell assembly reaches each of the predetermined upper limit and the predetermined lower limit while the cell assembly is charged with the charge current.

Additionally, the voltage measuring unit may be further configured to measure a voltage across the battery pack and a voltage across the bypass resistor.

Additionally, the processor may be further configured to receive at least one of the voltage across the battery pack and the voltage across the bypass resistor from the voltage measuring unit, and control the opening/closing operation of the charging FET based on the received at least one of the voltage across the battery pack and the voltage across the bypass resistor.

Additionally, the processor may be configured to control the opening/closing operation of the charging FET so that a voltage equal to a sum of a difference between the voltage across the battery pack and the predetermined upper limit, and a voltage drop value of the cell assembly, is applied to the bypass resistor when the charging FET is turned off.

Additionally, the processor may be configured to control the opening/closing operation of the charging FET to uniformly maintain the voltage across the battery pack for a turn off period during which the charge current flows in the bypass resistor and the charging FET is turned off.

Additionally, the charging FET may include a gate terminal, a drain terminal and a source terminal, the gate terminal may be configured to be electrically connected to the processor, the drain terminal may be configured to be electrically connected to the negative terminal of the cell assembly, and the source terminal may be configured to be electrically connected to the negative terminal of the battery pack.

Additionally, the bypass resistor may have a first terminal connected on the charge/discharge line connecting the negative terminal of the cell assembly to the drain terminal of the charging FET, and a second terminal connected on the charge/discharge line connecting the negative terminal of the battery pack to the source terminal of the charging FET.

Additionally, to achieve the above-described object, a battery management system according to an embodiment of the present disclosure includes the apparatus for preventing overcharge according to the present disclosure.

Additionally, to achieve the above-described object, a battery pack according to an embodiment of the present disclosure includes the apparatus for preventing overcharge according to the present disclosure.

Additionally, to achieve the above-described object, an electrically powered device according to an embodiment of the present disclosure includes the apparatus for preventing overcharge according to the present disclosure.

Additionally, a method for preventing overcharge according to an embodiment of the present disclosure is a method that prevents the overcharge of a cell assembly provided in a battery pack, the battery pack including at least one secondary battery, and the method includes measuring a voltage across the cell assembly, receiving the voltage across the cell assembly measured by the step of measuring voltage, controlling an opening/closing operation of a charging FET based on the voltage across the cell assembly, the charging FET is provided on a charge/discharge line, the charge/discharge line electrically connecting one of a negative terminal of the cell assembly and a positive terminal of the cell assembly to one of a negative terminal of the battery pack and a positive terminal of the battery pack, controlling, by the charging FET, the conduction of a charge current flowing in the charge/discharge line, and controlling the opening/closing operation of the charging FET to cause the charge current to flow through a bypass resistor connected in parallel to the charging FET on a bypass line, the bypass line electrically connecting two terminals of the charging FET.

Additionally, the step of controlling the opening/closing operation of the charging FET may include repeatedly turning off and on the charging FET when the voltage across the cell assembly reaches each of a predetermined upper limit and a predetermined lower limit while the cell assembly is charged with the charge current.

Additionally, the step of controlling the opening/closing operation of the charging FET may include controlling the opening/closing operation of the charging FET to uniformly maintain the voltage across the battery pack for a turnoff period during which the charge current flows in the bypass resistor and the charging FET is turned off.

Advantageous Effects

According to an aspect of the present disclosure, it can be applied to both a system (hereinafter, regulated system) with voltage regulator and a system (hereinafter, unregulated system) with no voltage regulator, by regulating the voltage applied to the cell assembly.

According to another aspect of the present disclosure, it is possible to uniformly maintain the output voltage of the battery pack in a situation in which the cell assembly is not overcharged, thereby maintaining the output efficiency and extending the battery life.

According to still another aspect of the present disclosure, application to an unregulated system may improve the efficiency in manufacturing the battery pack and save the cost.

The present disclosure may have a variety of other effects, and these and other effects can be understood by the following description and will be apparent from the embodiments of the present disclosure.

BRIEF DESCRIPTION OF DRAWINGS

The accompanying drawings illustrate a preferred embodiment of the present disclosure, and together with the following detailed description of the present disclosure, serve to provide a further understanding of the technical aspects of the present disclosure, and thus the present disclosure should not be construed as limited to the drawings.

MODE FOR DISCLOSURE

Figure 1:
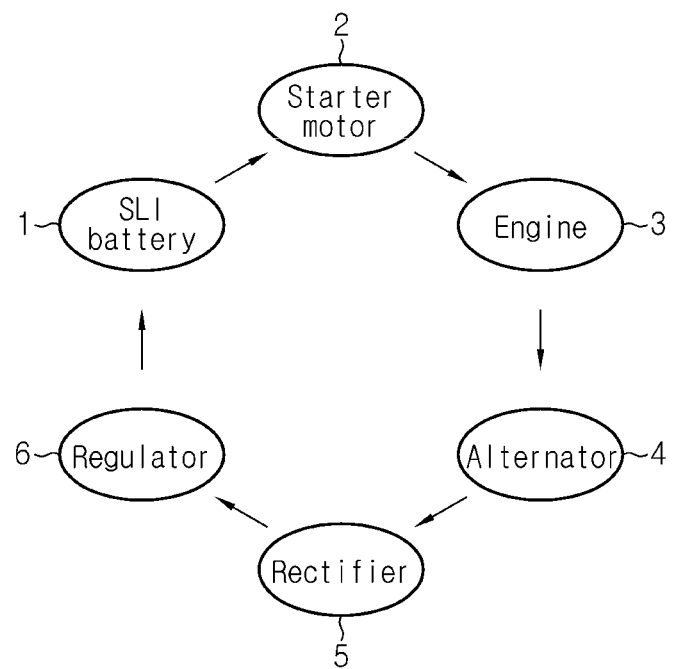
FIG. 1 is a schematic diagram showing a process in which a conventional Starting Lighting Ignition (SLI) battery is charged.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein.

Unless the context clearly indicates otherwise, it will be understood that the term "comprises" or "includes" when used in this specification, specifies the presence of stated elements, but does not preclude the presence or addition of one or more other elements. Additionally, the term 'processor' as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

In the specification, a secondary battery refers to a physically separable stand-alone cell having a negative terminal and a positive terminal. For example, a pouch type lithium polymer cell may be regarded as a secondary battery.

An apparatus for preventing overcharge according to an embodiment of the present disclosure may be an apparatus for preventing the overcharge of a cell assembly 10 that is provided in a battery pack and includes at least one secondary battery. For example, the battery pack may be a Starting Lighting Ignition (SLI) battery. Additionally, the cell assembly 10 may include at least one secondary battery connected in series and/or in parallel.

Figure 2:
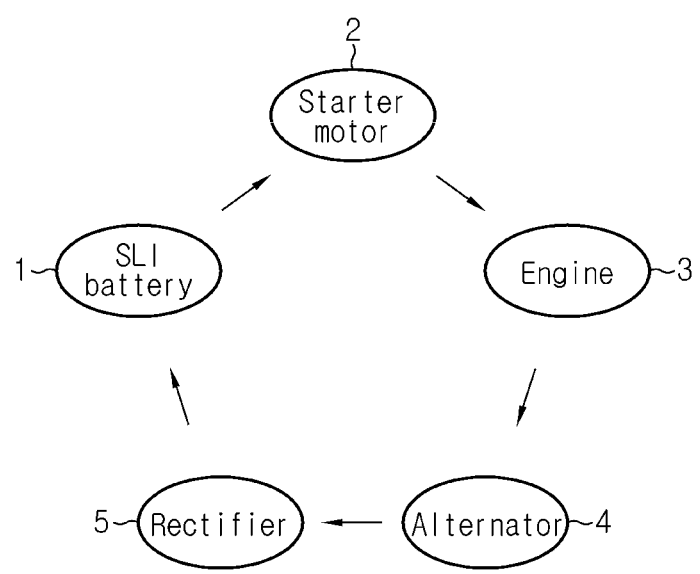
FIG. 2 is a schematic diagram showing a process in which an SLI battery according to an embodiment of the present disclosure is charged.

FIG. 1 is a schematic diagram showing a process in which the conventional SLI battery is charged, and FIG. 2 is a schematic diagram showing a process in which the SLI battery according to an embodiment of the present disclosure is charged.

Referring to FIGS. 1 and 2, the SLI battery 1 may transmit startup power to a starter motor 2. Subsequently, the starter motor 2 may transmit the startup power to an engine 3 based on the startup power supplied from the SLI battery 1. Subsequently, the engine 3 may start to operate based on the startup power supplied from the starter motor 2. Additionally, the engine 3 may transmit the operating power from the operation of the engine 3 to an alternator 4. Subsequently, the alternator 4 may transmit the operating power supplied from the engine 3 to a rectifier 5. Subsequently, the rectifier 5 may rectify the operating power supplied from the alternator 4.

As shown in FIG. 1, the conventional SLI battery 1 may be supplied and charged with the regulated operating power from a regulator 6 that regulates the operating power rectified by the rectifier 5.

The SLI battery 1 according to an embodiment of the present disclosure may be supplied and charged with the operating power directly from the rectifier 5 without going through the regulator 6 as shown in FIG. 2.

Through this configuration, as shown in FIG. 2, the SLI battery 1 according to an embodiment of the present disclosure may be provided in an unregulated system with no regulator and prevent the overcharge of the battery by regulation of the operating power without voltage regulation by the regulator 6.

Of course, the SLI battery 1 according to an embodiment of the present disclosure may be provided in a regulated system with the regulator 6.

Figure 3:
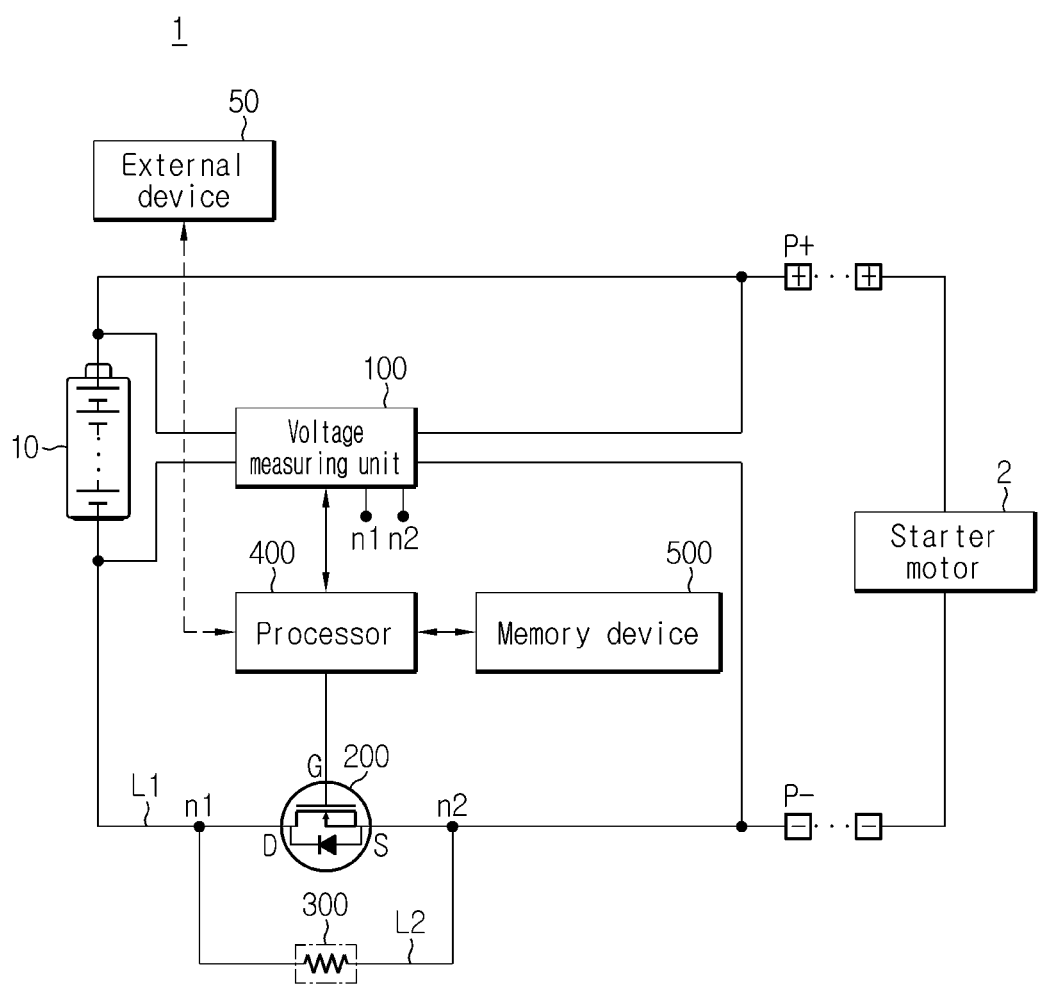
FIG. 3 is a schematic diagram showing a configuration of an apparatus for preventing overcharge according to an embodiment of the present disclosure.

FIG. 3 is a schematic diagram showing a configuration of an apparatus for preventing overcharge according to an embodiment of the present disclosure.

Referring to FIG. 3, the SLI battery 1 according to an embodiment of the present disclosure includes an apparatus for preventing overcharge. Additionally, the apparatus for preventing overcharge according to an embodiment of the present disclosure may include a voltage measuring unit 100, a charging FET 200, a bypass resistor 300 and a processor 400.

The voltage measuring unit 100 may measure the voltage across the cell assembly 10. For example, as shown in the configuration of FIG. 3, the voltage measuring unit 100 may be electrically connected to each of two terminals of the cell assembly 10 to transmit and receive an electrical signal to/from the cell assembly 10. Additionally, the voltage measuring unit 100 may measure the voltage across the cell assembly 10 based on the electrical signal received from the two terminals of the cell assembly 10.

Preferably, the voltage measuring unit 100 may be electrically connected to the processor 400 to transmit and receive an electrical signal to/from the processor 400. Additionally, the voltage measuring unit 100 may measure the voltage across the cell assembly 10 at a time interval under the control of the processor 400 and output a signal indicating the magnitude of the measured voltage to the processor 400. For example, the voltage measuring unit 100 may be implemented as a voltage measurement circuit commonly used in the art.

The charging FET 200 may be provided on a charge/discharge line L1 electrically connecting one terminal of the cell assembly 10 to the pack terminal of the battery pack. For example, as shown in the configuration of FIG. 3, the charging FET 200 may be provided on the charge/discharge line L1 electrically connecting the negative terminal of the cell assembly 10 to the negative pack terminal of the battery pack.

Additionally, the charging FET 200 may control the conduction of the charge current flowing in the charge/discharge line L1. For example, as shown in the configuration of FIG. 3, the charging FET 200 may control the conduction of the charge current flowing from the negative terminal of the cell assembly 10 toward the negative pack terminal of the battery pack.

For example, the charging FET 200 is a Field Effect Transistor (FET) device having gate terminal G, drain terminal D, and source terminal S, and may be turned on or off according to whether a channel is formed by the voltage applied between the gate terminal G and the source terminal S. For example, the FET device may be a Metal Oxide Semiconductor Field Effect Transistor (MOSFET).

Additionally, the charging FET 200 may have a parasitic diode. As shown in the configuration of FIG. 3, when the charging FET 200 have the parasitic diode, the charging FET 200 may be divided into the FET body and the parasitic diode. Here, the parasitic diode is a diode connected in parallel to the FET body, and may perform rectification function of passing the current in one direction. Meanwhile, although the charging FET 200 is implemented as an N-type MOSFET in the embodiment of FIG. 3, the charging FET 200 is not limited to the N-type MOSFET.

Preferably, the gate terminal G of the charging FET 200 according to an embodiment of the present disclosure may be electrically connected to the processor 400. For example, as shown in the configuration of FIG. 3, the gate terminal G may be electrically connected to the processor 400 to transmit and receive an electrical signal to/from the processor 400. Additionally, the drain terminal D of the charging FET 200 may be electrically connected to the negative terminal of the cell assembly 10. Additionally, the source terminal S of the charging FET 200 may be electrically connected to the negative terminal of the battery pack.

The bypass resistor 300 may be provided on a bypass line L2 electrically in parallel with the charge/discharge line L1, and the bypass line L2 electrically connects the two terminals of the charging FET 200. For example, as shown in the configuration of FIG. 3, the bypass resistor 300 may be provided on the bypass line L2. Here, the bypass line L2 may be a wire with one end connected to the drain terminal D of the charging FET 200 and the other end connected to the source terminal S of the charging FET 200.

Additionally, as shown in the configuration of FIG. 3, the bypass line L2 may be electrically in parallel with the charge/discharge line L1 connecting a first node n1 to a second node n2.

Additionally, the bypass resistor 300 may be connected in parallel to the charging FET 200. For example, as shown in the configuration of FIG. 3, the bypass resistor 300 may be electrically in parallel connected to the charging FET 200 between the first node n1 and the second node n2.

Additionally, the bypass resistor 300 may cause the charge current to flow according to the opening/closing operation of the charging FET 200. For example, as shown in the configuration of FIG. 3, when the charge current flows from the negative terminal of the cell assembly 10 toward the negative terminal of the battery pack, and the charging FET 200 is turned on, the charge current may flow on the charge/discharge line L1 and the charge current may not flow on the bypass line L2 having the bypass resistor 300.

Additionally, when the charge current flows from the negative terminal of the cell assembly 10 toward the negative terminal of the battery pack, and the charging FET 200 is turned off, the charge current may not flow on the charge/discharge line L1 and the charge current may flow on the bypass line L2 having the bypass resistor 300.

Preferably, as shown in the configuration of FIG. 3, the bypass resistor 300 according to an embodiment of the present disclosure may have one terminal connected to the first node n1 on the charge/discharge line L1 connecting the negative terminal of the cell assembly 10 to the drain terminal D of the charging FET 200, and the other terminal connected to the second node n2 on the charge/discharge line L1 connecting the negative terminal of the battery pack to the source terminal S of the charging FET 200.

The processor 400 may receive a value of the voltage across the cell assembly 10 from the voltage measuring unit 100, and control the opening/closing operation of the charging FET 200 based on the received value of the voltage across the cell assembly 10. For example, the processor 400 may control the turn-on and -off operation of the charging FET 200 based on the value of the voltage across the cell assembly 10.

Preferably, when the charge current charging the cell assembly 10 flows on the charge/discharge line L1, and the value of the voltage across the cell assembly 10 reaches a predetermined upper limit, the processor 400 according to an embodiment of the present disclosure may turn off the charging FET 200. For example, when the value of the voltage across the cell assembly 10 reaches 14.8V, the processor 400 may turn off the charging FET 200.

Preferably, when the charge current charging the cell assembly 10 flows on the charge/discharge line L1, and the value of the voltage across the cell assembly 10 reaches a predetermined lower limit, the processor 400 according to an embodiment of the present disclosure may turn on the charging FET 200. For example, when the value of the voltage across the cell assembly 10 reaches 14.3V, the processor 400 may turn on the charging FET 200.

Preferably, when the value of the voltage across the cell assembly 10 reaches each of the predetermined upper limit and the predetermined lower limit while the cell assembly 10 is charged with the charge current, the processor 400 according to an embodiment of the present disclosure may turn off and on the charging FET 200 repeatedly a few times. For example, when the value of the voltage across the cell assembly 10 reaches each of 14.8V and 14.3V, the processor 400 may turn off and on the charging FET 200 repeatedly a few times.

Preferably, the processor 400 may be electrically connected to an external device 50 to transmit and receive an electrical signal to/from the external device 50. For example, the processor 400 may receive an ignition signal from the external device 50. For example, the external device 50 may be an Electric Control Unit (ECU).

Preferably, referring to FIGS. 2 and 3, the battery pack according to an embodiment of the present disclosure may be connected to the starter motor 2. Additionally, the battery pack according to an embodiment of the present disclosure may be connected to the rectifier 5. Through this configuration, the battery pack according to an embodiment of the present disclosure may transmit the power supplied from the rectifier 5 to the starter motor 2. Additionally, the battery pack may be charged through the power supplied from the rectifier 5.

Preferably, the apparatus for preventing overcharge according to an embodiment of the present disclosure may further include a memory device 500 as shown in the configuration of FIG. 3.

The memory device 500 may be electrically connected to the processor 400 to transmit and receive an electrical signal to/from the processor 400. The memory device 500 may pre-store information necessary for the operation of the apparatus for preventing overcharge. For example, the memory device 500 may pre-store the predetermined upper limit and the predetermined lower limit for the value of the voltage across the cell assembly 10.

Meanwhile, the processor 400 may be implemented selectively including the processor 400, an Application-Specific Integrated Circuit (ASIC), a chipset, a logic circuit, a register, a communication modem and/or a data processing device, well known in the art to the perform the above-described operation.

Meanwhile, the memory device 500 is not limited to a particular type and includes any type of storage media capable of recording and erasing information. For example, the memory device 500 may be, RAM, ROM, register, hard disk, an optical recording medium or a magnetic recording medium. Additionally, the memory device 500 may be electrically connected to the processor 400, for example, through a data bus, to allow the processor 400 to access. Additionally, the memory device 500 may store and/or update and/or erase and/or transmit programs including various types of control logics that are executed by the processor 400, and/or data created when the control logics are executed.

Figure 4:
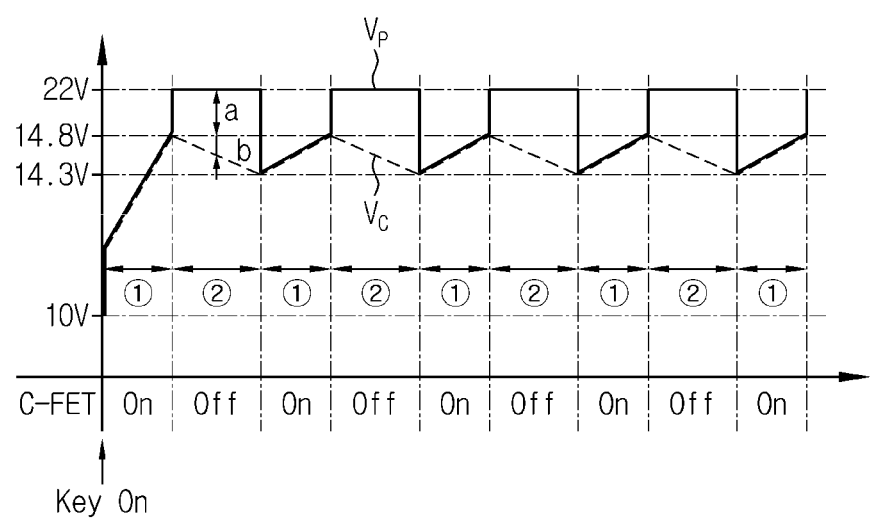
FIG. 4 shows a voltage profile of a battery pack and a cell assembly that is referred by an apparatus for preventing overcharge according to an embodiment of the present disclosure.

FIG. 4 shows a voltage profile of the battery pack and the cell assembly that is referred by the apparatus for preventing overcharge according to an embodiment of the present disclosure.

Referring to FIGS. 3 and 4, the voltage measuring unit 100 according to an embodiment of the present disclosure may be further configured to measure the voltage across the battery pack and the voltage across the bypass resistor 300. For example, as shown in the configuration of FIG. 3, the voltage measuring unit 100 may be electrically connected to each of the two terminals of the battery pack and each of the two terminals of the bypass resistor 300 to transmit and receive electrical signal. Additionally, the voltage measuring unit 100 may measure the voltage across the battery pack and the voltage across the bypass resistor 300 based on the electrical signal received from the two terminals of the battery pack and the two terminals of the bypass resistor 300.

Preferably, the processor 400 according to an embodiment of the present disclosure may be further configured to receive at least one of a value of the voltage across the battery pack and a value of the voltage across the bypass resistor 300 from the voltage measuring unit 100, and may control the opening/closing operation of the charging FET 200 based on the received at least one of the value of the voltage across the battery pack and the value of the voltage across the bypass resistor 300.

For example, in the embodiment of FIGS. 3 and 4, when the processor 400 receives an ignition signal, the processor 400 may turn on the charging FET 200. In this case, during the charging FET turn-on period (①), the charge current may flow on the charge/discharge line L1, the cell assembly 10 may be charged with the charge current, and the value of the voltage across the cell assembly 10 may increase to 14.8V. Subsequently, when the value of the voltage across the cell assembly 10 is 14.8V, the processor 400 may compute that the value of the voltage across the battery pack will increase to 22V if the processor 400 turns off the charging FET 200, and may turn off the charging FET 200. In this case, the processor 400 may compute that the value of the voltage across the battery pack will increase to 22V if the processor 400 turns off the charging FET 200 based on the internal resistance of the cell assembly 10, the combined resistance value of the bypass resistor 300 and the operating power supplied from the rectifier 5, and may turn off the charging FET 200. Alternatively, when the value of the voltage across the cell assembly 10 is 14.8V, the processor 400 may compute that the value of the voltage across the bypass resistor 300 of 7.2V will be applied if the processor 400 turns off the charging FET 200, and may turn off the charging FET 200. In this case, the processor 400 may compute that the value of the voltage across the bypass resistor 300 of 7.2V will be applied if the processor 400 turns off the charging FET 200 based on the internal resistance of the cell assembly 10, the combined resistance value of the bypass resistor 300 and the operating power supplied from the rectifier 5, and may turn off the charging FET 200. For example, in the embodiment of FIG. 4, during the charging FET turn-on period (①), the charge current of 2 A may flow on the charge/discharge line L1, and during the charging FET turn-off period (②), the charge current of 0.15 A may flow on the bypass line L2. In this case, the resistance value of the bypass resistor may be 48Ω.

Preferably, when the charging FET 200 is turned off, the processor 400 according to an embodiment of the present disclosure may control the opening/closing operation of the charging FET 200 so that voltage corresponding to the sum of a voltage value corresponding to a difference between the value of the voltage across the battery pack and the predetermined upper limit and a voltage drop value of the cell assembly 10 may be applied to the bypass resistor 300.

For example, in the embodiment of FIG. 4, the processor 400 may turn off the charging FET 200 so that voltage a+b corresponding to the sum of a voltage value a corresponding to a difference between the value $V_P$ of the voltage across of the battery pack and the predetermined upper limit (14.8V) and a voltage drop value b of the cell assembly 10 corresponding to a difference between the predetermined upper limit (14.8V) and the value $V_C$ of the voltage across the cell assembly 10 may be applied to the bypass resistor 300. Here, the voltage drop value b of the cell assembly 10 may be a voltage drop component that occurs due to the reduction in the magnitude of the charge current flowing in the cell assembly 10.

Preferably, the processor 400 according to an embodiment of the present disclosure may control the opening/closing operation of the charging FET 200 so that the value of the voltage across the battery pack may be uniformly maintained for the turn off period during which the charge current flows in the bypass resistor 300 and the charging FET 200 is turned off.

For example, referring to FIGS. 2 to 4, the processor 400 may control the opening/closing operation the charging FET 200 to uniformly maintain the value of the voltage across the battery pack based on the operating power supplied from the rectifier 5. Additionally, the processor 400 may control the opening/closing operation of the charging FET 200 to uniformly maintain the value of the voltage across the battery pack at 22V during the charging FET turn-off period (②). For example, when the value of the voltage across the cell assembly 10 reaches each of the predetermined upper limit and the predetermined lower limit while the cell assembly 10 is charged with the charge current, the processor 400 may turn off and on the charging FET 200 repeatedly a few times. For example, when the value of the voltage across the cell assembly 10 reaches each of 14.8V and 14.3V, the processor 400 may turn off and on the charging FET 200 repeatedly a few times.

Through this configuration, the apparatus for preventing overcharge according to an embodiment of the present disclosure may regulate the charge voltage without voltage regulation by a regulator to prevent the battery from being overcharged, and uniformly maintain the output voltage of the battery pack above a predetermined voltage for use as a battery for ignition.

The apparatus for preventing overcharge according to the present disclosure may be applied to a Battery Management System (BMS). That is, the BMS according to the present disclosure may include the apparatus for preventing overcharge according to the present disclosure as described above. In this configuration, at least some of the components of the apparatus for preventing overcharge according to the present disclosure may be implemented by supplementing or adding the functions of the components conventionally included in the BMS. For example, the processor 400 and the memory device 500 of the apparatus for preventing overcharge according to the present disclosure may be implemented as the components of the BMS.

Additionally, the apparatus for preventing overcharge according to the present disclosure may be provided in a battery pack. That is, the battery pack according to the present disclosure may include the apparatus for preventing overcharge according to the present disclosure as described above. Here, the battery pack may include at least one secondary battery, the apparatus for preventing overcharge, electrical equipment (BMS, relays, fuses, etc.) and a case.

Additionally, the apparatus for preventing overcharge according to the present disclosure may be provided in an electrically powered device. For example, the electrically powered device may be a scooter, a tractor or a vehicle including the battery pack equipped with the apparatus for preventing overcharge according to the present disclosure.

Figure 5:
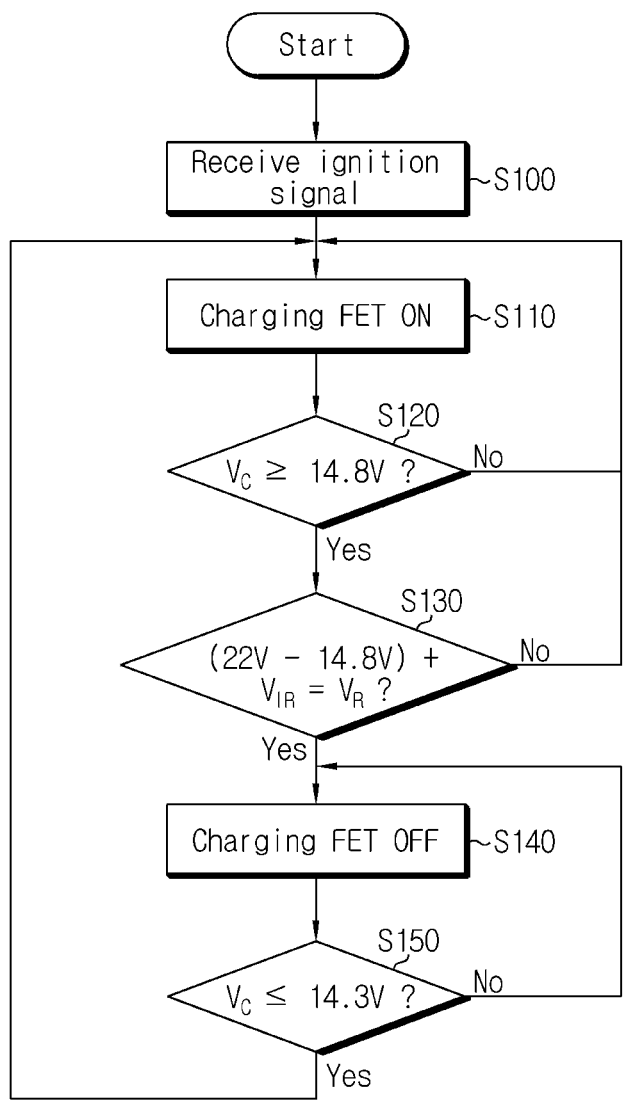
FIG. 5 is a schematic flowchart showing a method for preventing overcharge according to an embodiment of the present disclosure.

FIG. 5 is a schematic flowchart showing a method for preventing overcharge according to an embodiment of the present disclosure.

In step S100, the processor may receive an ignition signal. For example, the ignition signal may be an ignition signal received from the external device.

Subsequently, in step S110, the processor may turn on the charging FET. In this case, the cell assembly may be charged with the charge current flowing on the charge/discharge line.

Subsequently, in step S120, the processor may measure the voltage across the cell assembly. Additionally, the processor may determine whether a value $V_C$ of the voltage across the cell assembly is equal to or more than the predetermined upper limit 14.8V. When the result of the step S120 is "YES", the method may move to the next step S130, and otherwise, the method may return to the step S110.

Subsequently, in step S130, the processor may calculate a difference between the value of the voltage across the battery pack and the predetermined upper limit, and determine whether the sum of the calculated value and a voltage drop value $V_{IR}$ of the cell assembly corresponds to a value $V_R$ of the voltage across the bypass resistor. For example, the value of the voltage across the battery pack may be 22V, and the predetermined upper limit may be 14.8V. When the result of the step S130 is "YES", the method may move to the next step S140, and otherwise, the method may return to the step S110.

Subsequently, in step S140, the processor may turn off the charging FET.

Subsequently, in step S150, the processor may measure the voltage across the cell assembly. Additionally, the processor may determine whether a value $V_C$ of the voltage across the cell assembly is equal to or less than the predetermined lower limit 14.3V. When the result of the step S150 is "YES", the method may return to the step S110, and otherwise, the method may return to the step S140.

The method for preventing overcharge according to an embodiment of the present disclosure includes the steps of measuring voltage, controlling the opening/closing operation of the charging FET, and controlling the charge current.

First, in the step of measuring voltage, voltage across the cell assembly may be measured. Subsequently, in the step of controlling of the opening/closing operation of the charging FET, a value of the voltage across the cell assembly measured by the step of measuring voltage may be received, and the opening/closing operation of the charging FET provided on the charge/discharge line electrically connecting one terminal of the cell assembly to the pack terminal of the battery pack, and configured to control the conduction of the charge current flowing in the charge/discharge line may be controlled based on the received value of the voltage across the cell assembly. Subsequently, in the step of controlling the charge current, the charge current may be controlled to flow through the bypass resistor connected in parallel to the charging FET according to the opening/closing operation of the charging FET. Herein, the bypass resistor may be provided on the bypass line electrically connected in parallel with the charge/discharge line and electrically connecting two terminals of the charging FET.

Preferably, in the step of controlling the opening/closing operation of the charging FET, when the value of the voltage across the cell assembly reaches each of the predetermined upper limit and the predetermined lower limit while the cell assembly is charged with the charge current, the charging FET may be turned off and on repeatedly a few times.

Preferably, in the step of performing control to cause the charge current to flow, the opening/closing operation of the charging FET may be controlled to uniformly maintain the value of the voltage across the battery pack for the turn-off period during which the charge current flows in the bypass resistor and the charging FET is turned off.

Additionally, when the control logic is implemented in software, the processor may be implemented as a set of program modules. In this instance, the program module may be stored in the memory device and executed by the processor.

Additionally, there is no particular limitation on the type of control logics of the processor if at least one of the control logics may be combined and the combined control logics may be written in computer-readable coding system to allow the computer to access and read. For example, the recording media include at least one selected from the group consisting of ROM, RAM, register, CD-ROM, magnetic tape, hard disk, floppy disk and an optical data recording device. Additionally, the coding system may be stored and executed in computers connected via a network in distributed manner. Additionally, functional programs, codes and segments for implementing the combined control logics may be easily inferred by programmers in the technical field pertaining to the present disclosure.

While the present disclosure has been hereinabove described with regard to a limited number of embodiments and drawings, the present disclosure is not limited thereto and various modifications and changes may be made by those skilled in the art within the technical aspects of the present disclosure and the equivalent scope of the appended claims.

DESCRIPTION OF REFERENCE NUMERALS

1: SLI battery
10: Cell assembly
50: External device
100: Voltage measuring unit
200: Charging FET
300: Bypass resistor
400: Processor
500: Memory device
L1: Charge/discharge line
L2: Bypass line

What is claimed is:

1. An apparatus for preventing overcharge of a cell assembly provided in a battery pack, the battery pack including at least one secondary battery, the apparatus comprising:
   a voltage measuring unit configured to measure a voltage across the cell assembly;
   a charging FET provided on a charge/discharge line electrically connecting one of a negative terminal of the cell assembly and a positive terminal of the cell assembly to one of a negative terminal of the battery pack and a positive terminal of the battery pack, the charging FET being configured to control the conduction of a charge current flowing in the charge/discharge line;
   a bypass resistor connected in parallel to the charging FET on a bypass line, the bypass line electrically connecting two terminals of the charging FET, and the bypass line being configured to cause the charge current to flow according to an opening/closing operation of the charging FET; and
   a processor configured to:
      be electrically connected to an external device to transmit and to receive an ignition signal from the external device,
      receive the voltage across the cell assembly from the voltage measuring unit, and
      control the opening/closing operation of the charging FET based on the voltage across the cell assembly,
   wherein a gate terminal of the charging FET is directly electrically connected to the processor to transmit and receive an electrical signal to/from the processor, and
   wherein a drain terminal of the charging FET is directly electrically connected to the negative terminal of the cell assembly.

2. The apparatus for preventing overcharge according to claim 1, wherein the processor is configured to turn off the charging FET when the charge current charging the cell assembly flows on the charge/discharge line and the voltage across the cell assembly reaches a predetermined upper limit.

3. The apparatus for preventing overcharge according to claim 2, wherein the processor is configured to turn on the charging FET when the charge current charging the cell assembly flows on the charge/discharge line and the voltage across the cell assembly reaches a predetermined lower limit.

4. The apparatus for preventing overcharge according to claim 3, wherein the processor is configured to repeatedly turn off and on the charging FET when the voltage across the cell assembly reaches each of the predetermined upper limit and the predetermined lower limit while the cell assembly is charged with the charge current.

5. The apparatus for preventing overcharge according to claim 4, wherein the voltage measuring unit is further configured to measure a voltage across the battery pack and a voltage across the bypass resistor.

6. The apparatus for preventing overcharge according to claim 5, wherein the processor is further configured to:
 receive at least one of the voltage across the battery pack and the voltage across the bypass resistor from the voltage measuring unit, and
 control the opening/closing operation of the charging FET based on the received at least one of the voltage across the battery pack and the voltage across the bypass resistor.

7. The apparatus for preventing overcharge according to claim 6, wherein the processor is configured to control the opening/closing operation of the charging FET so that a voltage equal to a sum of a difference between the voltage across the battery pack and the predetermined upper limit, and a voltage drop value of the cell assembly, is applied to the bypass resistor when the charging FET is turned off.

8. The apparatus for preventing overcharge according to claim 7, wherein the processor is configured to control the opening/closing operation of the charging FET to uniformly maintain the voltage across the battery pack for a turn off period during which the charge current flows in the bypass resistor and the charging FET is turned off.

9. The apparatus for preventing overcharge according to claim 1, wherein the charging FET includes a gate terminal, a drain terminal and a source terminal,
 wherein the gate terminal is configured to be electrically connected to the processor,
 wherein the drain terminal is configured to be electrically connected to the negative terminal of the cell assembly, and
 wherein the source terminal is configured to be electrically connected to the negative terminal of the battery pack.

10. The apparatus for preventing overcharge according to claim 9, wherein the bypass resistor has a first terminal connected on the charge/discharge line connecting the negative terminal of the cell assembly to the drain terminal of the charging FET, and a second terminal connected on the charge/discharge line connecting the negative terminal of the battery pack to the source terminal of the charging FET.

11. A battery management system comprising the apparatus for preventing overcharge according to claim 1.

12. A battery pack comprising the apparatus for preventing overcharge according to claim 1.

13. A method for preventing overcharge of a cell assembly provided in a battery pack, the battery pack including at least one secondary battery, the method comprising:
 receiving, by a processor, an ignition signal from an external device;
 measuring a voltage across the cell assembly;
 receiving, by the processor, the voltage across the cell assembly measured by the step of measuring voltage,
 controlling, by the processor, an opening/closing operation of a charging FET based on the voltage across the cell assembly,
 wherein the charging FET is provided on a charge/discharge line, the charge/discharge line electrically connecting one of a negative terminal of the cell assembly and a positive terminal of the cell assembly to one of a negative terminal of the battery pack and a positive terminal of the battery pack;
 controlling, by the charging FET, the conduction of a charge current flowing in the charge/discharge line; and
 controlling, by the processor, the opening/closing operation of the charging FET to cause the charge current to flow through a bypass resistor connected in parallel to the charging FET on a bypass line, the bypass line electrically connecting two terminals of the charging FET,
 wherein a gate terminal of the charging FET is directly electrically connected to the processor to transmit and receive an electrical signal to/from the processor, and
 wherein a drain terminal of the charging FET is directly electrically connected to the negative terminal of the cell assembly.

14. The method for preventing overcharge according to claim 13, wherein the step of controlling the opening/closing operation of the charging FET comprises repeatedly turning off and on the charging FET when the voltage across the cell assembly reaches each of a predetermined upper limit and a predetermined lower limit while the cell assembly is charged with the charge current.

15. The method for preventing overcharge according to claim 13, wherein the step of controlling the opening/closing operation of the charging FET comprises controlling the opening/closing operation of the charging FET to uniformly maintain the voltage across the battery pack for a turnoff period during which the charge current flows in the bypass resistor and the charging FET is turned off.

* * * * *